(No Model.)

C. VATCKY.
PROCESS OF PLATING METALS.

No. 506,285. Patented Oct. 10, 1893.

Witnesses.
Kayser.
Carl Rossbach

Inventor.
Carl Vatcky
by
Robert Auler
Attorney.

UNITED STATES PATENT OFFICE.

CARL VATCKŸ, OF BORNHEIM, ASSIGNOR OF ONE-HALF TO EDWARD GOLL, OF OFFENBACH-ON-THE-MAIN, GERMANY.

PROCESS OF PLATING METALS.

SPECIFICATION forming part of Letters Patent No. 506,285, dated October 10, 1893.

Application filed January 11, 1893. Serial No. 458,044. (No specimens.)

*To all whom it may concern:*

Be it known that I, CARL VATCKŸ, a subject of the King of Prussia, German Emperor, and a resident of Bornheim, near Frankfort-on-the-Main, in the Province of Hesse-Nassau, Kingdom of Prussia, German Empire, have invented certain new and useful Improvements in the Plating of Metals, of which the following is a true specification.

My invention relates to the plating or coating of one metal with another metal possessing a lower fusing point than the former.

In the following specification the process of plating cast-iron with lead is described, as this composite plate is of great technical value, although not yet before manufactured.

Two alloys, serving as solders, of the following composition are first prepared; mercury, bismuth, copper, aluminium, zinc, tin, and lead. The solders differ in one having more mercury and lead and less aluminium in its composition, thus being somewhat more easily fusible than the other alloy. The iron plate is then first pickled, slightly warmed, and thereupon rubbed on one surface with the less fusible solder, which very easily melts. The lead plate is treated in a similar manner with the other more fusible solder, and the two plates are then pressed together with their two prepared surfaces. The iron plate is then again slightly warmed, the heat being sufficient not only to melt the less fusible solder, but also to penetrate through the same, and fuse the other solder on the lead plate thus intimately uniting the two plates, without in any way injuring the same. Other metals can be treated and plated with each other in a similar manner.

In order to render my improved method more intelligible, I have annexed a sheet of drawings, in which—

Figure 1:
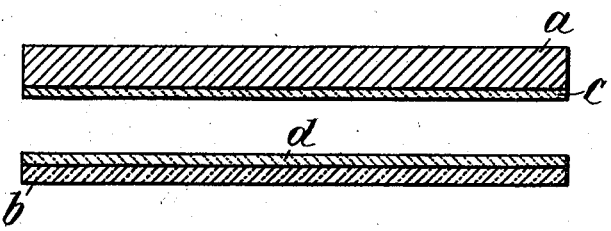
Figure 2:
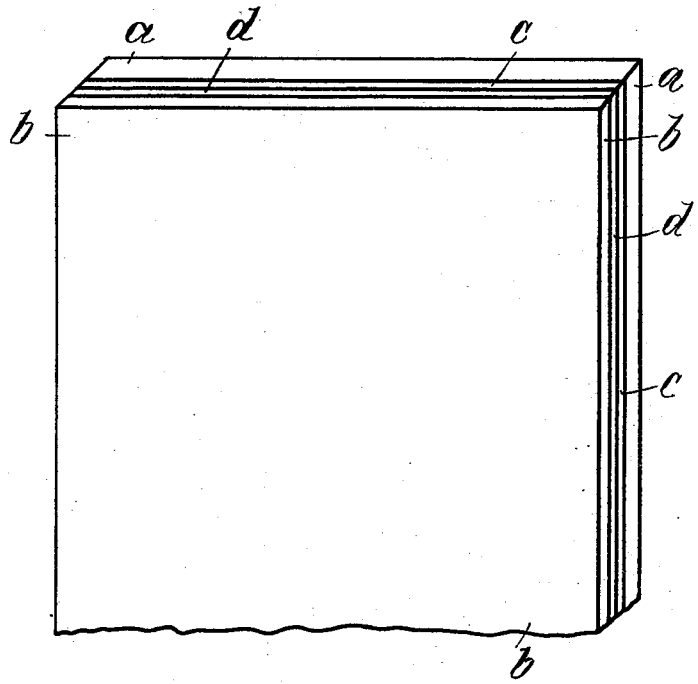

Figure 1 shows both sheets of metal provided with their layers of solder, but not yet united, and Fig. 2 represents both the sheets united, the layers of solder being shown in each case in greater thickness than used in practice, for the sake of distinctness.

In both figures *a* represents the sheet of the metal with the higher fusing-point (*e. g.* iron) and *b* the other metal (*e. g.* lead). The former is covered with the layer *c* of soft solder, the plate *b* with the layer *d* of soft solder, this latter layer being more fusible than layer *c*.

What I claim, and desire to secure by Letters Patent of the United States, is—

1. The method of plating one sheet of metal with another sheet of metal, consisting, first, in covering each sheet with a layer of soft solder, the layer on the metal with the higher fusing-point being less fusible than the other layer, and, second, in putting both sheets with their layers of solder together, and heating the compound-plate from the side of the metal with the higher fusing-point, for the purpose as described.

2. The method of plating one sheet of metal with another sheet of metal, consisting, first, in covering each sheet with a layer of soft solder, containing mercury, lead and aluminium, the layer on the metal with the higher fusing-point containing less mercury, less lead and more aluminium than the other layer, and, second, in putting both sheets with their layers together, and heating the compound-plate from the side of the metal with the higher fusing-point, for the purpose as described.

3. The method of plating cast-iron with lead, consisting, first, in covering each metal with a layer of soft solder, the layer on the iron being less fusible than that on the lead, and, second, in putting both metals together, and heating the compound-piece from the side of the iron, for the purpose as described.

4. The method of plating cast-iron with lead, consisting, first, in covering each metal with a layer of soft solder, containing mercury, lead and aluminium, the layer on the iron containing less mercury, less lead and more aluminium than the other layer, and, second, in putting both metals with their layers together, and heating the compound-piece from the side of the iron for the purpose as described.

In testimony whereof I have signed this specification in the presence of two subscribing witnesses.

CARL VATCKŸ.

Witnesses:
 ALVESTO P. HOGUE,
 JEAN GRUND.